United States Patent
Kawano

(10) Patent No.: US 8,483,635 B2
(45) Date of Patent: Jul. 9, 2013

(54) BROADCAST RECEIVING APPARATUS AND RADIO RECEIVING APPARATUS

(75) Inventor: Takashi Kawano, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 163 days.

(21) Appl. No.: 13/090,799

(22) Filed: Apr. 20, 2011

(65) Prior Publication Data

US 2011/0294455 A1 Dec. 1, 2011

(30) Foreign Application Priority Data

Jun. 1, 2010 (JP) ................................ 2010-125572

(51) Int. Cl.
*H04B 17/02* (2006.01)
(52) U.S. Cl.
USPC .......................... 455/136; 455/160.1; 455/297
(58) Field of Classification Search
USPC ................ 455/136, 140, 160.1, 161.1–161.2, 455/231, 297, 345, 343.2
See application file for complete search history.

(56) References Cited

U.S. PATENT DOCUMENTS

| | | | |
|---|---|---|---|
| 6,141,536 A | 10/2000 | Cvetkovic et al. | |
| 2002/0072341 A1* | 6/2002 | Ricard et al. | 455/174.1 |
| 2004/0267451 A1* | 12/2004 | Park et al. | 701/213 |
| 2008/0299926 A1 | 12/2008 | Becker et al. | |
| 2009/0063911 A1* | 3/2009 | Tsukio et al. | 714/708 |

FOREIGN PATENT DOCUMENTS

JP 06-013924 1/1994

* cited by examiner

*Primary Examiner* — Christian Hannon
(74) *Attorney, Agent, or Firm* — Brinks Hofer Gilson & Lione

(57) ABSTRACT

A broadcast receiving apparatus includes a first tuner configured to receive a broadcast wave from a specified broadcasting station, a second tuner configured to perform a frequency search for receivable broadcasting stations, a power supply unit configured to supply power to the first tuner and the second tuner, a traveling state detection unit configured to determine if a vehicle is moving or is stopped, a reception state detection unit configured to detect a reception state of a currently-received broadcast wave, and a control unit configured to control the first tuner, the second tuner, the power supply unit, the traveling state detection unit, and the reception state detection unit. The control unit causes power to be supplied to the second tuner and causes the second tuner to perform a frequency search while the vehicle is traveling, and when it is determined that the vehicle has stopped, the control unit turns the power supplied to the second tuner on and off in accordance with the reception state of the broadcast wave.

18 Claims, 6 Drawing Sheets

BROADCAST RECEIVING APPARATUS AND RADIO RECEIVING APPARATUS

PRIORITY CLAIM

This application claims the benefit of Japanese Patent Application No. 2010-125572, filed on Jun. 1, 2010, and which is incorporated by reference herein in its entirety.

BACKGROUND

1. Field of the Invention

The present invention relates to broadcast receiving apparatuses and radio receiving apparatuses, and particularly relates to broadcast receiving apparatuses and radio receiving apparatuses that are advantageous in the reduction of the energy consumption of a receiving apparatus provided with two tuners.

2. Description of Related Art

Recently, radio receivers are capable of receiving not only audio broadcasts but also broadcasts in which traffic information data, data of the frequency of an alternative broadcasting station that is broadcasting the same program as the broadcast being received, or the like are multiplexed with an FM signal.

A radio receiver that receives this type of multiplexed broadcast is provided with multiple tuners, receiving radio broadcasts through the main tuner, and detecting receivable broadcasting stations through a sub-tuner.

For example, analyzing data related to alternative broadcasting stations makes it possible, when the reception of the current broadcasting station worsens, to detect alternative broadcasting stations and carry out automatic tracking by automatically changing the reception frequency. This in turn makes it possible to attain a better state of reception.

With respect to this, Japanese Patent Application Publication 1994(H6)-13924A discloses a technique, employed when switching to an alternate frequency, in which audio dropouts are eliminated by switching to the audio output tuner when the frequency has been tuned to an alternative broadcasting station that has good reception on the non-audio signal output tuner.

As described above, with a radio receiver provided with multiple tuners, even if the reception of a current broadcast worsens, the broadcast can be listened to by searching for a receivable broadcasting station and switching to an alternate frequency.

By the way, electric automobiles, hybrid vehicles, and so on are coming into actual use in response to recent environmental issues. Of such electric automobiles, hybrid vehicles, and so on, vehicles of which engines stop when the vehicle is stopped are becoming more and more common. There is thus a problem in that when the radio is listened to while the vehicle is stopped, the battery is depleted and excessively discharged, which shortens the overall life of the vehicle battery.

Having been achieved in light of the stated problem with the related art, the present invention provides a broadcast receiving apparatus and a radio receiving apparatus capable of reducing energy consumption in a receiving apparatus provided with multiple tuners when the vehicle is stopped.

SUMMARY

In order to solve the aforementioned conventional technical problem, an aspect of the present invention provides a broadcast receiving apparatus including: a first tuner that receives a broadcast wave from a specified broadcasting station; a second tuner that performs a frequency search for receivable broadcasting stations; a power supply unit that generates power to be supplied to the first tuner and the second tuner; a traveling state detection unit that detects whether or not a vehicle is stopped; a reception state detection unit that detects the reception state of a currently-received broadcast wave; and a control unit that controls the first tuner, the second tuner, the power supply unit, the traveling state detection unit, and the reception state detection unit. The control unit causes power to be supplied to the second tuner and causes the second tuner to perform the frequency search while the vehicle is traveling, and when it is determined that the vehicle is stopped, the control unit turns the power supplied to the second tuner on and off in accordance with the reception state of the broadcast wave.

In the broadcast receiving apparatus according to this aspect, the control unit may turn the power supplied to the second tuner off when it is determined that a multi-pass level indicating the reception state is less than or equal to a predetermined value. In addition, the control unit may cause diversity reception to be performed using the first tuner and the second tuner when it is determined that the multi-pass level indicating the reception state is greater than the predetermined value. The broadcast receiving apparatus may further include a storage unit, and when the frequency search performed by the second tuner is only partially completed and it is determined that the reception state is stable, the control unit may turn the power supplied to the second tuner off after saving the state of the partially-completed frequency search in the storage unit. In addition, when the frequency search performed by the second tuner is only partially completed and it is determined that the reception state is unstable, the control unit may turn the power supplied to the second tuner off after the frequency search has completed a full pass.

In addition, when the vehicle has started traveling, the control unit may turn the power supplied to the second tuner on, extract the state of the frequency search saved in the storage unit, and cause the second tuner to resume the frequency search from partway through. In addition, when the vehicle has started traveling, the control unit may turn the power supplied to the second tuner on and cause the second tuner to perform the frequency search from an initial frequency in the frequency search. In addition, when the vehicle has started traveling, the control unit may turn the power supplied to the second tuner on, and when the multi-pass level is less than or equal to the predetermined value, cause the frequency search to resume. In addition, when the vehicle has started traveling, the control unit may turn the power supplied to the second tuner on, and when the multi-pass level is greater than the predetermined value, cause diversity reception to be performed by the first tuner and the second tuner.

Furthermore, another aspect of the present invention provides a radio receiving apparatus including: a first tuner that receives a broadcast wave from a specified broadcasting station; a second tuner that performs a frequency search for receivable broadcasting stations; a power supply unit that generates power to be supplied to the first tuner and the second tuner; a traveling state detection unit that detects whether or not a vehicle is stopped; a reception state detection unit that detects the reception state of a currently-received broadcast wave; and a control unit that controls the first tuner, the second tuner, the power supply unit, the traveling state detection unit, and the reception state detection unit. The control unit causes power to be supplied to the second tuner and causes the second tuner to perform the frequency search while the vehicle is traveling, and when it is determined that the vehicle is stopped, the control unit turns the power supplied to the second tuner on and off in accordance with the reception state of the broadcast wave.

In the radio receiving apparatus according to this aspect, the control unit may turn the power supplied to the second tuner off when it is determined that a multi-pass level indicating the reception state is less than or equal to a predetermined value. In addition, the control unit may cause diversity reception to be performed using the first tuner and the second tuner when it is determined that the multi-pass level indicating the reception state is greater than the predetermined value. The radio receiving apparatus may further include a storage unit, and when the frequency search performed by the second tuner is only partially completed and it is determined that the reception state is stable, the control unit may turn the power supplied to the second tuner off after saving the state of the partially-completed frequency search in the storage unit. In addition, when the frequency search performed by the second tuner is only partially completed and it is determined that the reception state is unstable, the control unit may turn the power supplied to the second tuner off after the frequency search has completed a full pass.

In addition, when the vehicle has started traveling, the control unit may turn the power supplied to the second tuner on, extract the state of the frequency search saved in the storage unit, and cause the second tuner to resume the frequency search from partway through. In addition, when the vehicle has started traveling, the control unit may turn the power supplied to the second tuner on and cause the second tuner to perform the frequency search from an initial frequency in the frequency search. In addition, when the vehicle has started traveling, the control unit may turn the power supplied to the second tuner on, and when the multi-pass level is less than or equal to the predetermined value, cause the frequency search to resume. In addition, when the vehicle has started traveling, the control unit may turn the power supplied to the second tuner on, and when the multi-pass level is greater than the predetermined value, cause diversity reception to be performed by the first tuner and the second tuner.

According to the broadcast receiving apparatus and the radio receiving apparatus of the present invention, one of the two tuners is used for the frequency search, and the power supplied to the tuner used for the frequency search is turned off in accordance with the broadcast reception state when the vehicle has stopped traveling. For example, if the multi-pass level is less than a predetermined value when the vehicle is stopped, the power supplied to the tuner used for frequency searches is turned off, whereas if the multi-pass level is greater than the predetermined value, the diversity reception operations are carried out using the two tuners. Through this, favorable reception can be maintained while the energy consumption of the receiver is reduced.

Furthermore, the timing at which the power supplied to the tuner that is carrying out the frequency search is adjusted in accordance with the state of the frequency search when the vehicle is stopped. For example, when the frequency search has been partially completed, that partial state is saved, and the power is then turned off; when the reception state is unstable, the power is turned off after the frequency search has completed a full pass. Through this, it is possible to obtain the latest list of broadcasting stations that can be received when the vehicle is stopped.

DETAILED DESCRIPTION

Hereinafter, embodiments of the present invention will be described with reference to the drawings.

Figure 1:
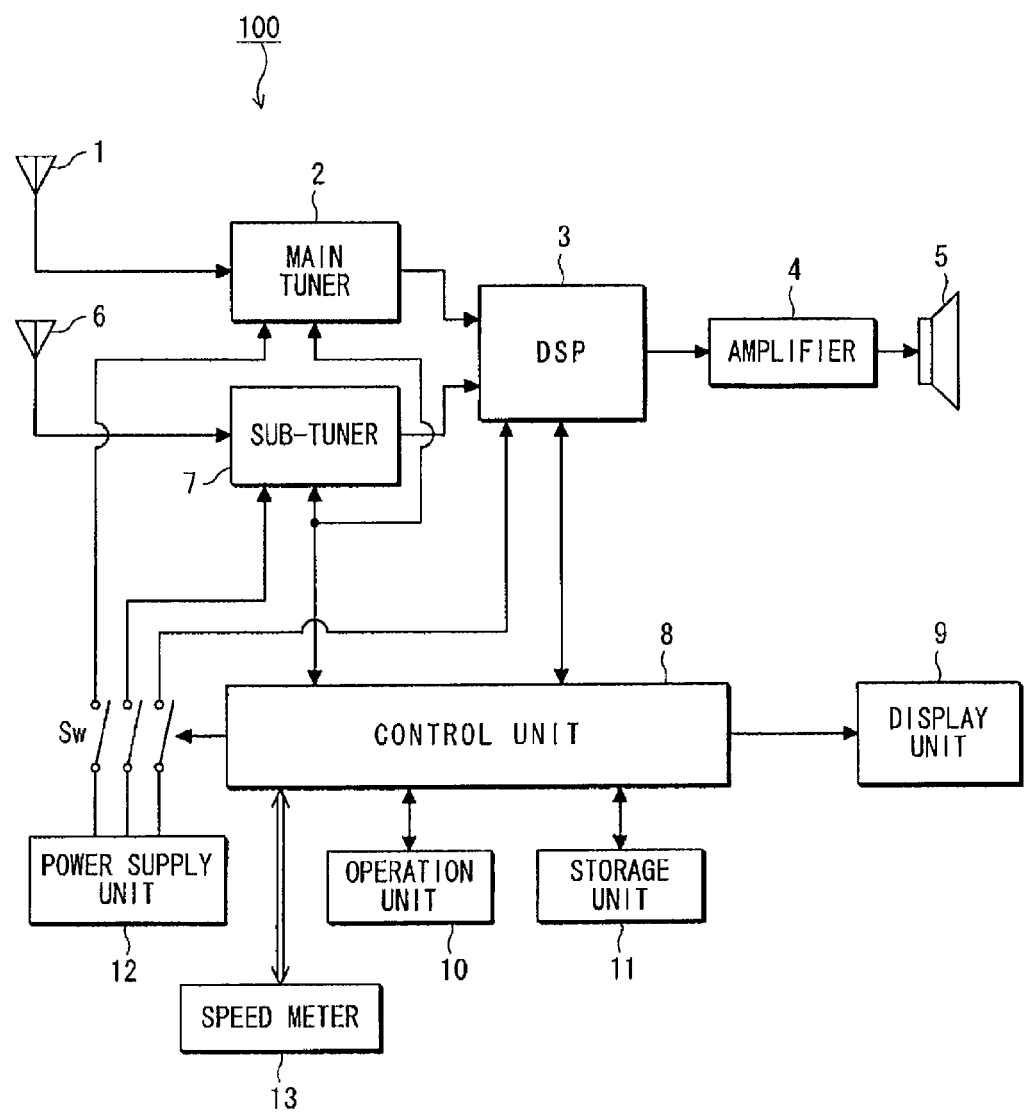
FIG. 1 is a block diagram illustrating the configuration of a radio receiving apparatus according to an embodiment of the present invention.

FIG. 1 is a block diagram illustrating the configuration of a radio receiving apparatus 100 according to an embodiment of the present invention. As shown in FIG. 1, the radio receiving apparatus 100 has a basic configuration that includes a main antenna 1, a main tuner 2, a sub-antenna 6, a sub-tuner 7, a DSP (Digital Signal Processor) 3, an amplifier 4, a speaker 5, a control unit 8, a display unit 9, an operation unit 10, a storage unit 11, and a power supply unit 12. Furthermore, the control unit 8 is connected to a speed meter 13 via a CAN (Controller Area Network) bus, which is a bus used in vehicles.

The main antenna 1 is installed on a part of the body of a vehicle. The main antenna 1 captures broadcast waves sent from a broadcasting station and supplies those broadcast waves to the main tuner 2.

The main tuner 2 receives the broadcast signal sent from the broadcasting station and captured by the main antenna 1, and outputs that broadcast signal to the DSP 3, under the control of the control unit 8.

Note that the main tuner 2 includes an RF amplifier that obtains an RF signal from the main antenna 1 and amplifies that signal, a tuning circuit that selects the frequency signal of a desired broadcasting station from the amplified RF signal, a mixer that generates an intermediate frequency (IF) signal by mixing a frequency signal from a local oscillator and the RF signal, and an S-meter circuit that extracts a reception field strength signal (S-meter signal) of the IF signal by detecting the direct current of the IF signal. The IF signal, the S-meter signal, and so on are converted into digital signals and outputted to the DSP 3.

Meanwhile, the main tuner 2 searches for channels (broadcasting stations) that can currently be received when the execution of a channel search, such as a channel seek, a channel scan, or the like, has been instructed by operations performed through the operation unit 10.

The sub-tuner 7 has a similar configuration as the main tuner 2. The sub-tuner 7 continuously searches for frequencies of broadcasting stations that can be received, without receiving instructions from the operation unit 10. In other words, the sub-tuner 7 changes the setting of the reception frequency in predetermined increments (for example, in units of 0.1 Hz) and determines whether or not the reception of a broadcast signal is possible in each of the frequencies; the sub-tuner 7 then extracts receivable frequencies, of which reception strength is greater than or equal to a predetermined value, creates a list of the broadcasting stations corresponding to these reception frequencies, and stores the list in the storage unit 11.

The DSP 3 carries out various types of signal processes, such as digital filtering, audio decoding, data decoding, and so on, on the digital signal output from the main tuner 2 and the sub-tuner 7. For example, the DSP 3 extracts a digital audio signal by decoding the audio signal output from the main tuner 2. This digital audio signal is converted into an analog audio signal and amplified by the amplifier 4, and is then supplied to the speaker 5.

The control unit 8 is configured of a microcomputer, and controls the various elements of the radio receiving apparatus 100 based on programs stored in a ROM (not shown). For example, when a control signal for setting a channel has been inputted through operations of the operation unit 10, the channel that the main tuner 2 is to receive is determined, and the reception frequency that matches this channel is set in the main tuner 2. In addition, the reception state of broadcast waves and so on is determined based on the signal from the DSP 3.

The display unit 9 is configured of, for example, a liquid crystal display (LCD), and displays the broadcasting station name of the broadcasting station that is being received, the names of receivable broadcasting stations obtained as a result of a frequency search, and so on. Note that in the case of the RDS (radio data system), which is employed in Europe, the names of the broadcasting stations are obtained from PS (program/service name) data.

The operation unit 10 is provided with operation buttons and the like necessary for operating the radio receiving apparatus 100, and instructs the selection of a desired broadcasting station.

The storage unit 11 is configured of a hard disk, a semiconductor memory, or the like, and stores broadcasting station lists, information of partially-completed frequency searches when the vehicle is stopped, and so on.

The power supply unit 12 converts a voltage supplied from a battery (not shown) into voltages required by the various elements, such as the main tuner 2, the sub-tuner 7, and so on, and supplies those voltages to the various elements under the control of the control unit 8.

With the radio receiving apparatus 100 configured in this manner, when the vehicle is stopped, the power supply to the sub-tuner 7 and the sub-antenna 6 that carry out frequency searches is turned off when the reception state of the radio receiving apparatus 100 is favorable, whereas the two tuners are caused to carry out diversity reception operations when the reception state is not favorable.

Note that while the vehicle is traveling, frequency searching is carried out continuously, and a broadcasting station list, which is a list of broadcasting stations of which broadcasts can be received at the current location of the vehicle, is created. The creation of this broadcasting station list is executed by using the sub-tuner to seek within the entire frequency band range and register information regarding broadcasts that can be received into the broadcasting station list.

Although the amount of time required for the seeking performed by the sub-tuner depends on the number of broadcasting stations, this seeking will require approximately two minutes. The sub-tuner repeatedly executes the search operations carried out through this seeking.

Figure 2:
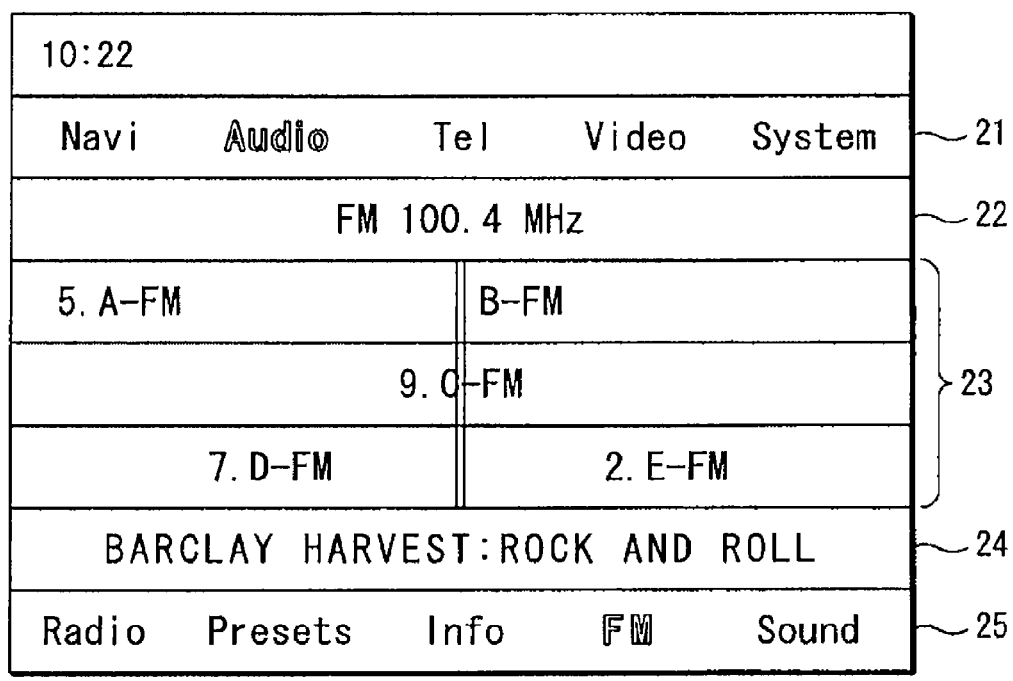
FIG. 2 is an example of a display screen showing a broadcasting station list extracted through a broadcasting station search.

FIG. 2 illustrates an example of a broadcasting station list screen display. In FIG. 2, a screen display selection item 21 indicates that "audio" is selected, whereas a type selection item 25 indicates that "FM" is selected; the names of five broadcasting stations are displayed in a broadcasting station name display area 23. Although all of the broadcasting stations determined through the frequency search to be receivable are registered in the broadcasting station lists, the names of only some of those stations (in FIG. 2, five stations) are displayed due to the amount of display area in the screen. Furthermore, the frequency of the current broadcasting station (C-FM) is displayed in a frequency display area 22, whereas the title of a song that is currently being broadcast is outputted to a song title display area 24.

Hereinafter, a power source control process performed on tuners that perform frequency searches when the vehicle is stopped will be described with reference to FIGS. 3 through 6.

Figure 3:
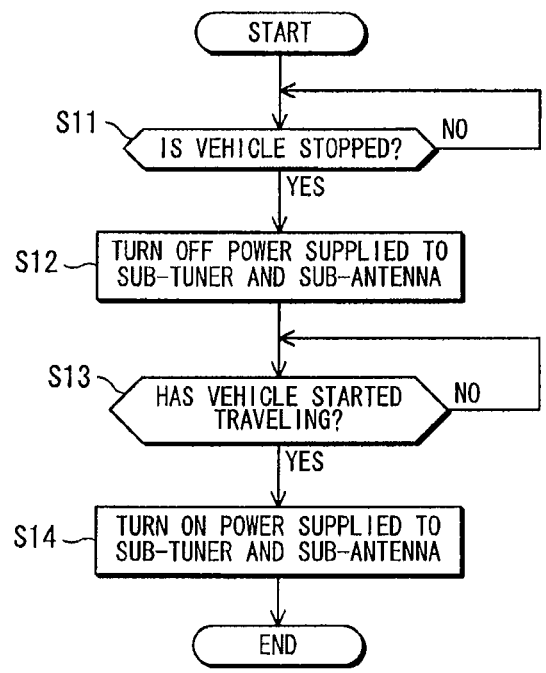
FIG. 3 is a flowchart illustrating an example of a power source control process for a sub-tuner, performed when a vehicle is stopped.

FIG. 3 is a flowchart illustrating an example of a process, performed by the control unit 8 of the radio receiving apparatus 100, for controlling the power supply to the sub-tuner 7 to be turned on or off.

First, in step S11 in FIG. 3, whether or not the vehicle is stopped is detected. The fact that the vehicle is stopped is determined by receiving information that the speed of the vehicle has reached zero from the speed meter 13, via a vehicle bus such as a CAN or the like. The system stands by until the vehicle has stopped, and when it is determined that the vehicle has stopped, the process moves to step S12.

In step S12, the power supplied to the sub-tuner 7 and the sub-antenna 6 is turned off. The control unit 8 stops the supply of power from the power supply unit 12 to the sub-tuner 7 and the sub-antenna 6 by controlling a switch Sw.

In step S13, whether or not the vehicle has started traveling is determined. As in step S11, the fact that the vehicle has started traveling is determined by receiving information that the speed of the vehicle is not zero any more, from the speed meter 13 via the vehicle bus. The system stands by until the vehicle starts traveling, and when it is determined that the vehicle has started traveling, the process moves to step S14.

In step S14, power is supplied to the sub-tuner 7 and the sub-antenna 6. The control unit 8 supplies power from the power supply unit 12 to the sub-tuner 7 and the sub-antenna 6 by controlling the switch Sw. After power is supplied thereto, the sub-tuner 7 continues the frequency search.

As described using the flowchart shown in FIG. 3, in the present embodiment, the power supplied to the sub-tuner 7 and the sub-antenna 6 that are carrying out the frequency search is turned off when the vehicle has stopped traveling. Through this, the energy consumption of the radio receiving apparatus 100 can be reduced while the vehicle is stopped.

Next, a process for controlling the power supplied to the sub-tuner 7 to turn on/off that takes into consideration the reception state of a broadcast being listened to when the vehicle is stopped will be described with reference to the flowchart illustrated in FIG. 4.

Figure 4:
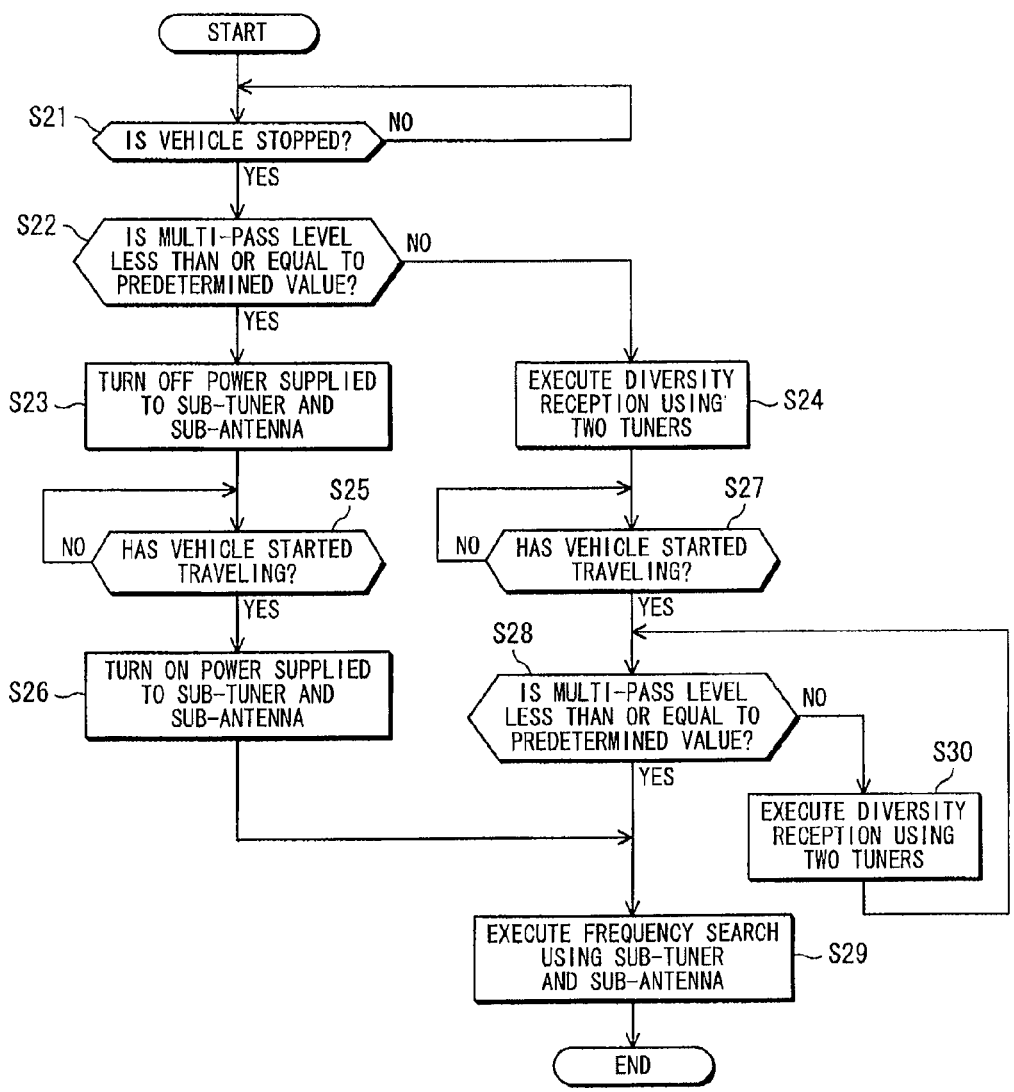
FIG. 4 is a flowchart illustrating an example of a power source control process for the sub-tuner, including a multi-pass detection process, performed when the vehicle is stopped.

First, in step S21 in FIG. 4, whether or not the vehicle is stopped is detected. The system stands by until the vehicle is stopped, and when it is determined that the vehicle is stopped, the process moves to step S22.

In step S22, a multi-pass value, indicating the reception state of broadcast waves in the radio receiving apparatus 100, is determined. When it is determined that the multi-pass level is less than or equal to a predetermined value and the reception state is favorable, the process moves to step S23, whereas when it is determined that the multi-pass level is greater than the predetermined value and the reception state has worsened, the process moves to step S24.

A multi-pass noise component is detected by carrying out a digital filtering process on the S-meter signal outputted to the DSP 3.

In step S23, the power supplied to the sub-tuner 7 and the sub-antenna 6 is turned off.

On the other hand, in step S24, the power supplied to the sub-tuner 7 and the sub-antenna 6 is not turned off, and instead, the two tuners, i.e. the main tuner 2 and the sub-tuner 7, carry out diversity reception.

The diversity reception may be carried out using a known method. For example, the main tuner 2 and the sub-tuner 7 are set to receive the same channel and the channel of which reception is better is selected and received, or a phase diversity method is used, in which the main tuner 2 and the sub-tuner 7 receive signals having the same content and adjust the phase of one of the output signals, realizing a favorable reception sensitivity by combining those signals.

After the power supplied to the sub-tuner 7 and the sub-antenna 6 has been turned off in step S23, it is determined, in step S25, whether or not the vehicle has started traveling. The system stands by until the vehicle starts traveling, and the process moves to step S26 when the vehicle has started traveling.

In step S26, power is once again supplied to the sub-tuner 7 and the sub-antenna 6. Then, in step S29, the sub-tuner 7 and the sub-antenna 6 continue the frequency search.

On the other hand, when the diversity reception is being executed in step S24, it is determined whether or not the vehicle has started traveling in step S27. The system stands by until the vehicle starts traveling, and the process moves to step S28 when the vehicle has started traveling.

In step S28, it is determined whether or not the multi-pass level is less than or equal to the predetermined value. A multi-pass noise component is detected by carrying out a digital filtering process on the S-meter signal outputted to the DSP 3.

When it is determined that the multi-pass level is less than or equal to the predetermined and the reception is favorable, the process moves to step S29, and the sub-tuner is caused to carry out a frequency search. However, when it is determined that the multi-pass level is greater than the predetermined value and the reception has worsened, the process moves to step S30, where the diversity reception is continued by the two tuners; the process then returns to the determination of the reception state in step S28.

Note that in the stated process, the multi-pass influence is assumed to be reduced when the vehicle is traveling, and thus the frequency search may be carried out by the sub-tuner 7 after the vehicle started traveling, without performing the processes of step S28 and step S30.

Through the process described above, the supply of power to the sub-tuner 7 and the sub-antenna 6 is stopped when the vehicle is stopped and the reception state is favorable, thus making it possible to ensure favorable reception while the energy consumption of the radio receiving apparatus is reduced to the greatest extent possible.

Next, a process, performed by the control unit 8, for controlling the power supplied to the sub-tuner 7 to turn on/off that takes into consideration the status of a frequency search when the vehicle is stopped will be described with reference to the flowcharts illustrated in FIG. 5 and FIG. 6.

Figure 5:
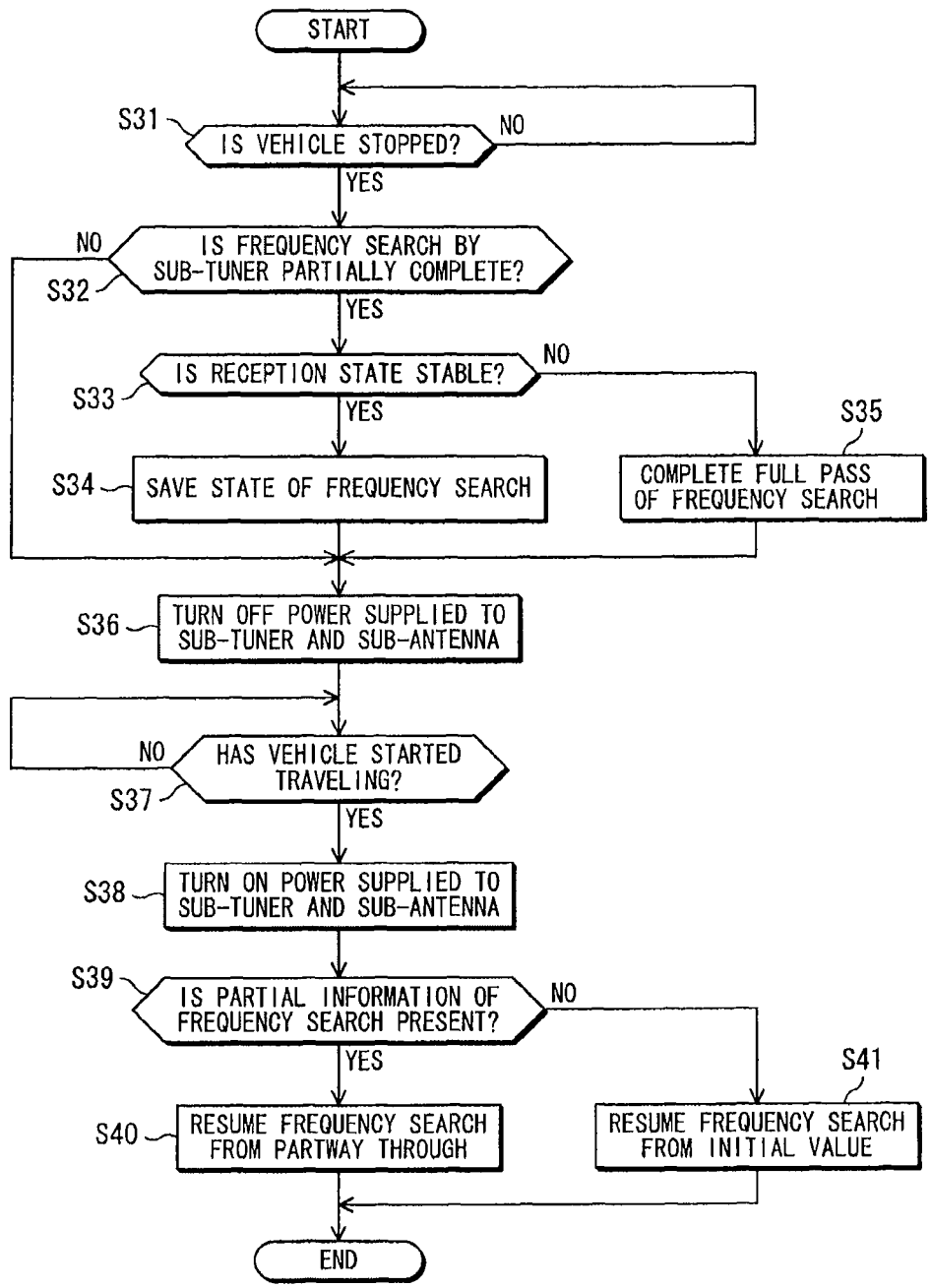
FIG. 5 is a flowchart illustrating an example of a power source control process for the sub-tuner, including a frequency search state detection process, performed when the vehicle is stopped.

FIG. 5 adds a process related to the status of the frequency search to the power on/off control process illustrated in FIG. 3.

First, in step S31 in FIG. 5, whether or not the vehicle is stopped is detected. The system stands by until the vehicle stops, and when it is determined that the vehicle is stopped, the process moves to step S32.

Next, in step S32, it is determined whether or not the sub-tuner 7 is currently carrying out a frequency search.

When the frequency search is currently being carried out, the process moves to step S33, whereas when the frequency search is not currently being carried out, the process moves to step S36. The frequency search is a seek operation spanning from the lowest (initial) frequency to the highest frequency within a predetermined frequency range, and the frequency search being "currently carried out" refers to a state in which the seek operation is between the lowest frequency and the highest frequency.

In step S33, it is determined whether or not the reception state is stable. When it is determined that the reception state is stable, the process moves to step S34, whereas when it is determined that the reception state is unstable, the process moves to step S35.

Whether or not the reception state is stable is determined by comparing the electrical field strength of the received signal of broadcast waves X detected through a frequency search performed when the vehicle is stopped to the electrical field strength of the received signal of broadcast waves X detected through a frequency search performed before the vehicle is stopped; the reception state is determined to be stable in the case where there is little change between the two. Alternatively, the reception state may be determined as being stable in the case where the value of the electrical field strength of the received signal detected through the frequency search when the vehicle is stopped is greater than or equal to a predetermined value, such as 60 dB, which is a reference input.

In step S34, a frequency search status indicating to what frequency the search has been carried out (that is, partial information of the frequency search) is saved in the storage unit 11.

However, when it is determined that the reception state is unstable, in step S35, the frequency search performed by the sub-tuner 7 is continued until the search completes a full pass.

In step S36, the power supplied to the sub-tuner 7 and the sub-antenna 6 is turned off.

In step S37, it is determined whether or not the vehicle has started traveling. The system stands by until the vehicle starts traveling, and when it is determined that the vehicle started traveling, the process moves to step S38, where power is supplied to the sub-tuner 7 and the sub-antenna 6.

In step S39, it is determined whether or not the partial information of the frequency search is saved in the storage unit 11. When this information is saved, the process moves to step S40, where the partial information of the frequency search saved in the storage unit 11 is extracted and the frequency search is resumed from the last frequency indicated in the partial information; however, in the case where the information is not saved, the process moves to step S41, where the frequency search is carried out from the initial frequency.

According to the process described thus far, the energy consumption of the radio receiving apparatus 100 while the vehicle is stopped can be reduced, and the latest information of receivable broadcasting stations while the vehicle is stopped can be obtained.

Next, a process, performed by the control unit 8, for controlling the power supplied to the sub-tuner 7 to turn on/off that takes into consideration the status of a frequency search when the vehicle is stopped and the reception state of the broadcast being listened to, will be described with reference to the flowchart illustrated FIG. 6. FIG. 6 adds a process related to the status of the frequency search to the power on/off control process illustrated in FIG. 4.

Figure 6:
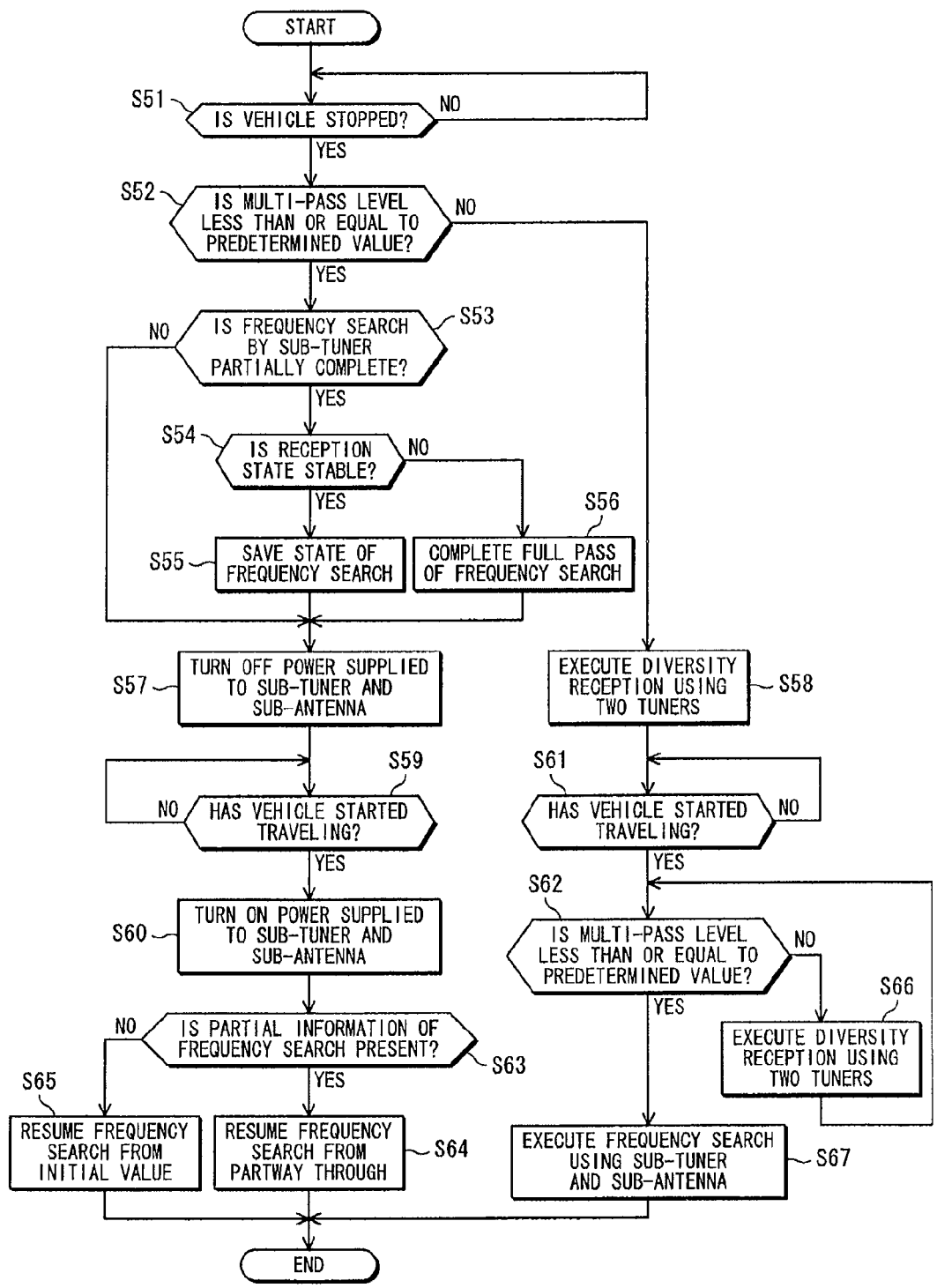
FIG. 6 is a flowchart illustrating an example of a power source control process for the sub-tuner, including a multi-pass detection process and a frequency search state detection process, performed when the vehicle is stopped.

First, in step S51 in FIG. 6, whether or not the vehicle is stopped is detected. The system stands by until the vehicle stops, and when it is determined that the vehicle is stopped, the process moves to step S52.

In step S52, it is determined whether or not the multi-pass level is less than or equal to a predetermined value. When the level is less than or equal to the predetermined value, the process moves to step S53, whereas when the level is greater than the predetermined value, the process moves to step S58.

Next, in step S53, it is determined whether or not the sub-tuner 7 is currently carrying out a frequency search. When the frequency search is currently being carried out, the process moves to step S54, whereas when the frequency search is not currently being carried out, the process moves to step S57.

In step S54, it is determined whether or not the reception state is stable. The process moves to step S55 when the reception state is stable, where the state of the frequency search carried out thus far is saved in the storage unit 11, whereas the process moves to step S56 when the reception state is not stable, where a full pass of the frequency search is completed.

In step S57, the power supplied to the sub-tuner 7 and the sub-antenna 6 is turned off.

In step S59, it is determined whether or not the vehicle has started traveling. The system stands by until the vehicle starts traveling, and when it is determined that the vehicle has started traveling, the process moves to step S60, where the power supply to the sub-tuner 7 and the sub-antenna 6 is resumed.

In step S63, it is determined whether or not the partial information of the frequency search is saved. When the information is saved, the process moves to step S64, where the partial information of the frequency search is extracted from the storage unit 11 and the frequency search is resumed from the last frequency indicated in the partial information; after this, the partial information stored in the storage unit 11 is deleted. However, when the information is not saved, the process moves to step S65, and the frequency search is resumed from the initial frequency.

However, when it is determined in step S52 that the multi-pass level is greater than the predetermined value, in step S58, diversity reception is executed by the two tuners without turning the sub-tuner 7 and the sub-antenna 6 off.

In step S61, it is determined whether or not the vehicle has started traveling. The system stands by until the vehicle has started traveling, and when it is determined that the vehicle has started traveling, the process moves to step S62, where it is determined whether or not the multi-pass level is less than or equal to the predetermined value. When the level is less than or equal to the predetermined value, the process moves to step S67, where the sub-tuner is caused to carry out the frequency search; however, when the multi-pass level is greater than the predetermined value, the process moves to step S66 and the diversity reception is continued by the two tuners, after which the process returns to the reception state determination in step S62.

Note that in the stated process, the multi-pass influence is assumed to be reduced while the vehicle is traveling, and thus the frequency search may be carried out by the sub-tuner 7 after the vehicle has started traveling, without performing the processes of step S62 and step S66.

As described thus far, according to the radio receiving apparatus of the present embodiments, one of the two tuners is used for the frequency search, and the power supplied to the tuner used for the frequency search is turned off in accordance with the broadcast reception state when the vehicle is stopped. For example, when the multi-pass level is less than a predetermined value when the vehicle is stopped, the power supplied to the tuner used for frequency searches is turned off, whereas when the multi-pass level is greater than the predetermined value, the diversity reception operations are carried out using the two tuners. Through this, favorable reception can be maintained while the energy consumption of the radio receiver is reduced.

Furthermore, the timing at which the power supplied to the tuner that is carrying out the frequency search is adjusted in accordance with the state of the frequency search while the vehicle is stopped. For example, when the frequency search has been partially completed, that partial state is saved, and the power is then turned off; when the reception state is unstable, the power is turned off after the frequency search has completed a full pass. Through this, it is possible to obtain the latest list of broadcasting stations of which broadcasts can be received while the vehicle is stopped.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A broadcast receiving apparatus comprising:
    a first tuner configured to receive a broadcast wave from a specified broadcasting station;
    a second tuner configured to perform a frequency search for receivable broadcasting stations;
    a power supply unit configured to selectively supply power to the first tuner and the second tuner;
    a traveling state detection unit configured to determine if a vehicle is moving or is stopped;
    a reception state detection unit configured to detect a reception state of a currently-received broadcast wave;
    a control unit configured to control the first tuner, the second tuner, the power supply unit, the traveling state detection unit, and the reception state detection unit;
    wherein the control unit causes power to be selectively supplied to and disconnected from the second tuner, and causes the second tuner to perform a frequency search while the vehicle is traveling; and
    wherein when it is determined that the vehicle has stopped, the control unit either supplies power to or disconnects power from the second tuner in accordance with the reception state of the broadcast wave.

2. The broadcast receiving apparatus according to claim 1, wherein the control unit turns the power supplied to the second tuner off when it is determined that a multi-pass noise level indicates that the reception state is less than or equal to a predetermined value.

3. The broadcast receiving apparatus according to claim 2, wherein the control unit causes diversity reception to be performed using the first tuner and the second tuner when it is determined that the multi-pass noise level indicates that the reception state is greater than the predetermined value.

4. The broadcast receiving apparatus according to claim 2, further comprising:
    a storage unit,
    wherein when the frequency search performed by the second tuner is partially completed and it is determined that the reception state is stable, the control unit turns off power to the second tuner after saving the state of the partially-completed frequency search in the storage unit.

5. The broadcast receiving apparatus according to claim 4, wherein when the frequency search performed by the second tuner is partially completed and it is determined that the reception state is unstable, the control unit turns off power to the second tuner after the frequency search has completed a full frequency search.

6. The broadcast receiving apparatus according to claim 4, wherein when the vehicle has started traveling, the control unit turns on power to the second tuner, extracts the state of the frequency search saved in the storage unit, and causes the second tuner to resume the frequency search.

7. The broadcast receiving apparatus according to claim 6, wherein when the vehicle has started traveling, the control unit turns on power to the second tuner and causes the second tuner to perform the frequency search from an initial frequency in the frequency search.

8. The broadcast receiving apparatus according to claim 3, wherein when the vehicle has started traveling, the control unit turns on power to the second tuner, and when the multi-pass noise level is less than or equal to a predetermined value, causes the frequency search to resume.

9. The broadcast receiving apparatus according to claim 3, wherein when the vehicle has started traveling, the control unit turns on power to the second tuner, and when the multi-pass noise level is greater than a predetermined value, causes diversity reception to be performed by the first tuner and the second tuner.

10. A radio receiving apparatus comprising:
  a first tuner configured to receive a broadcast wave from a specified broadcasting station;
  a second tuner configured to perform a frequency search for receivable broadcasting stations;
  a power supply unit configured to selectively supply power to the first tuner and the second tuner;
  a traveling state detection unit configured to determine if a vehicle is moving or is stopped;
  a reception state detection unit configured to detect the reception state of a currently-received broadcast wave;
  a control unit configured to control the first tuner, the second tuner, the power supply unit, the traveling state detection unit, and the reception state detection unit;
  wherein the control unit causes power to be selectively supplied to the second tuner and causes the second tuner to perform a frequency search while the vehicle is traveling; and
  wherein when it is determined that the vehicle has stopped, the control unit either supplies power to or disconnects power from the second tuner in accordance with the reception state of the broadcast wave.

11. The radio receiving apparatus according to claim 10, wherein the control unit turns off the power to the second tuner when it is determined that a multi-pass noise level indicates that the reception state is less than or equal to a predetermined value.

12. The radio receiving apparatus according to claim 11, wherein the control unit causes diversity reception to be performed using the first tuner and the second tuner when it is determined that the multi-pass noise level indicates that the reception state is greater than the predetermined value.

13. The radio receiving apparatus according to claim 11, further comprising:
  a storage unit,
    wherein when the frequency search performed by the second tuner is partially completed and it is determined that the reception state is stable, the control unit turns off power to the second tuner after saving the state of the partially-completed frequency search in the storage unit.

14. The radio receiving apparatus according to claim 13, wherein when the frequency search performed by the second tuner is partially completed and it is determined that the reception state is unstable, the control unit turns off power to the second tuner after the frequency search has completed a full frequency search.

15. The radio receiving apparatus according to claim 13, wherein when the vehicle has started traveling, the control unit turns the on power to the second tuner, extracts the state of the frequency search saved in the storage unit, and causes the second tuner to resume the frequency search.

16. The radio receiving apparatus according to claim 15, wherein when the vehicle has started traveling, the control unit turns on power to the second tuner and causes the second tuner to perform the frequency search from an initial frequency in the frequency search.

17. The radio receiving apparatus according to claim 12, wherein when the vehicle has started traveling, the control unit turns on power to the second tuner, and when the multi-pass noise level is less than or equal to a predetermined value, causes the frequency search to resume.

18. The radio receiving apparatus according to claim 12, wherein when the vehicle has started traveling, the control unit turns on power to the second tuner, and when the multi-pass noise level is greater than a predetermined value, causes diversity reception to be performed by the first tuner and the second tuner.

* * * * *